March 9, 1971  W. G. CREAGER  3,568,419
CHILI HARVESTER
Filed Feb. 25, 1969  2 Sheets-Sheet 1
Fig. 1
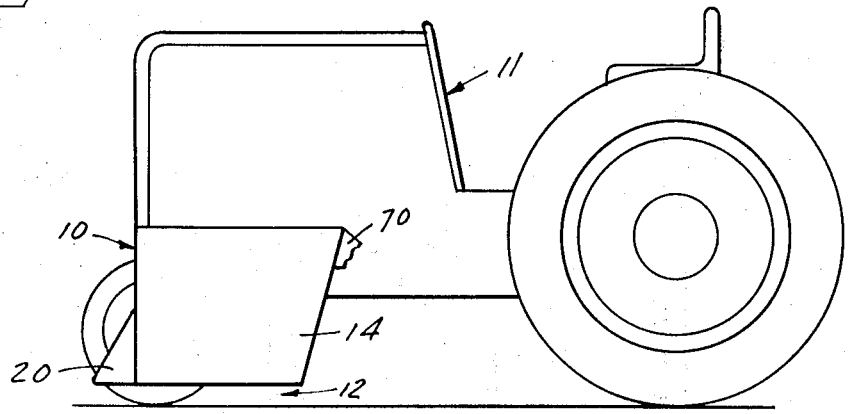
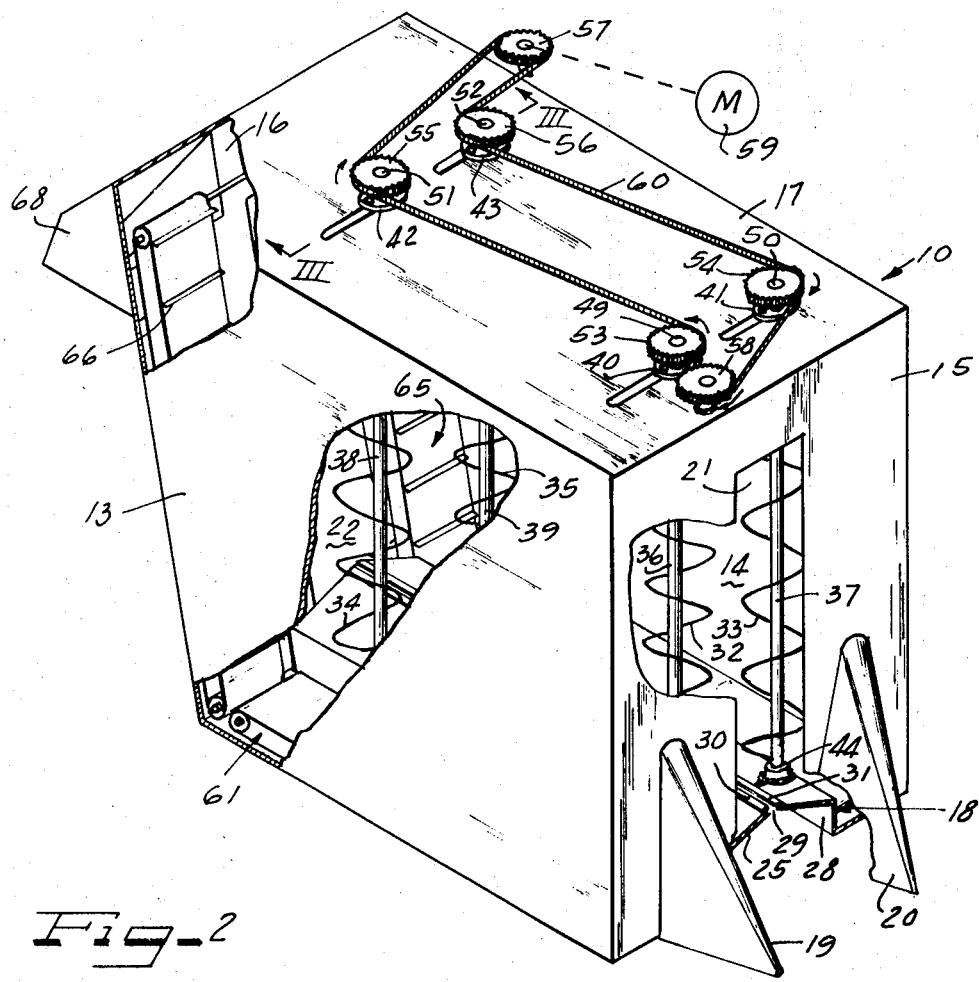
Fig. 2
INVENTOR.
WONDEL G. CREAGER
BY *[signature]* ATTORNEYS March 9, 1971 W. G. CREAGER 3,568,419
CHILI HARVESTER
Filed Feb. 25, 1969 2 Sheets-Sheet 2

INVENTOR.
WONDEL G. CREAGER

BY *[signature]* ATTORNEYS

United States Patent Office 3,568,419
Patented Mar. 9, 1971

3,568,419
CHILI HARVESTER
Wondel G. Creager, P.O. Box 518,
Hatch, N. Mex. 87937
Filed Feb. 25, 1969, Ser. No. 802,100
Int. Cl. A01d 45/22
U.S. Cl. 56—19                                    9 Claims

ABSTRACT OF THE DISCLOSURE

A harvesting machine which may be either self-propelled or tractor-mounted employs apparatus for guiding fruit-bearing plants into a picking mechanism wherein the plants are stripped of their produce at a pre-selected elevation by a plurality of elongate rotating flexible coils. Inasmuch as some plants possess a maturing characteristic wherein the lowermost fruit is the earliest to ripen, and as ripening is progressive from the bottom of the plant to the top of the plant, the axes of rotation of the flexible coils are disposed at an angle to the plants undergoing harvesting and are variable from a substantially vertical position to a variety of selectable angular positions in order that the plants may be progressively harvested from bottom or top upon several time-spaced passes through the field. Preselection of the substantially vertical positions of the rotating flexible coils permits harvest of an entire crop at one time.

BACKGROUND OF THE INVENTION

Field of the invention

This invention relates to harvesters, and in particular to harvesters for removing produce from plants at a preselected level above the ground without molesting unmatured produce about the selected level.

Description of the prior art

Harvesting apparatus is generally known in the art, particularly apparatus for harvesting grain, such as wheat and corn. Harvesting with this type of apparatus, however, is based upon the principle that the plant has fully produced at the time of harvest and is no longer useful as a growing, fruit-producing plant. Therefore, such harvesters, for example, corn pickers, utilize mechanisms which either destroy or partially destroy the plant in order to strip the plant of its produce.

Certain plants, however, possess a maturing characteristic wherein the lowermost fruit thereof is the earliest to mature and which early matured fruit may be advantageously harvested without waiting for the entire crop to mature. The chili plant, as well as other plants, fall into this category. Heretofore, harvesting of chili plants had to be performed either on the entire crop or the plants could be selectively harvested by hand. It is therefore highly desirable, and a primary object of the present invention, to povide a harvester for selectively harvesting matured fruit from plants without molesting fruit which will mature at a later time. It is also my purpose to provide harvesting apparatus which may be pre-set to harvest fruit at selected elevations in order to harvest a crop by making several passes through the field at different selected harvesting elevations, and to harvest a total crop, when necessary, upon a single pass through the field.

SUMMARY OF THE INVENTION

Briefly, according to the invention a harvester is provided as a tractor-mounted or as a self-propelled machine having forwardly extending tapered sections to guide the stalks of row-planted plants under harvest into the machine for processing. On the interior of the machine a plurality of generally vertically disposed rotating flexible coils are arranged on each side of the plants which are moving relative thereto, the rotating coils being effective to lift the fruit and snap the fruit from the plants whereupon the fruit falls to slanted floor sections where it is directed to a pair of fore and aft extending conveyors. This pair of conveyors transports the fruit to a corresponding pair of elevator conveyors at the rear of the machine for discharge through spouts or chutes to associated collecting apparatus which may take the form of baskets and/or additional conveyors to a trailer.

The rotating flexible coils are rotatably secured at their lower ends in self-centering bearings and are adjustable transversely of the machine at bearings at their upper ends to pre-select a desired elevation of picking. The self-centering bearings at the lower ends are also transversely adjustable and also form the pivot points for the flexible coils.

Power for rotating the coils and operating the conveyors may be provided by the tractor in the case of a tractor-mounted machine, or the apparatus may be provided with a separate powering source by means of conventional techniques.

BRIEF DESCRIPTION OF THE DRAWINGS

The foregoing and other objects, features and advantages of the present invention will become apparent, and the invention, its organization, construction and operation will be best understood from reference to the following detailed description taken in conjunction with the accompanying drawings, in which.

FIG. 1 is an elevational view of a harvester according to the present invention shown mounted on a tractor;

FIG. 2 is a pictorial illustration of a harvester having its housing broken away at selected locations to show the relationship between the various operating components thereof;

DESCRIPTION OF THE PREFERRED EMBODIMENT

Figure 3:
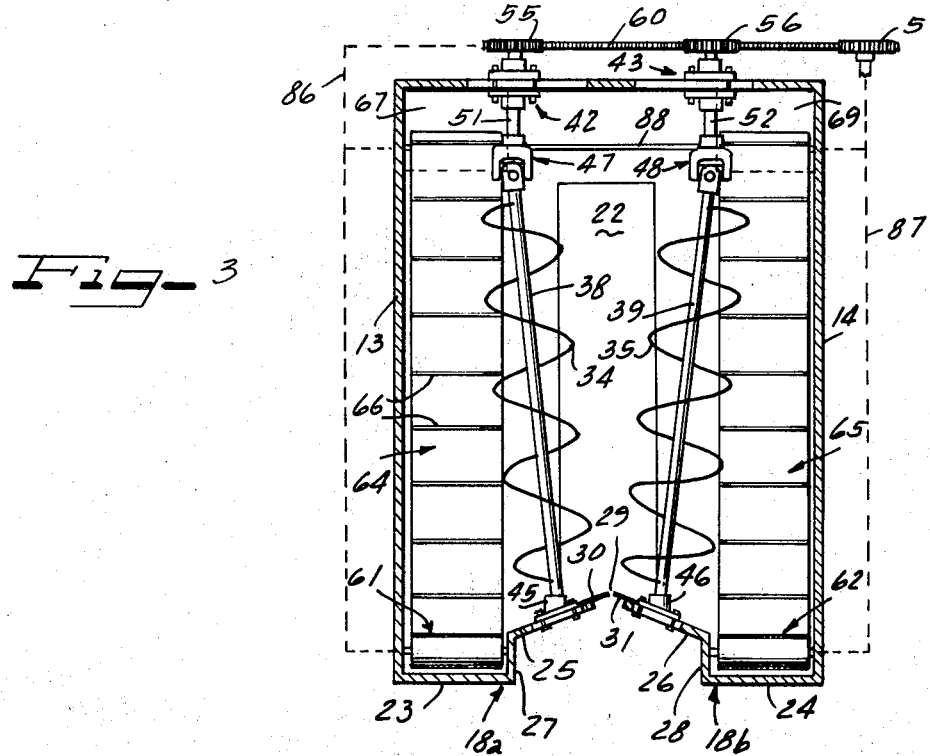
FIG. 3 is a cross-sectional view taken along the line III—III of FIG. 2 illustrating the picking coils and the conveyors for transporting and discharging the picked produce, and in particular illustrating the angular disposition of the picking coils and the provision for adjusting the angular disposition of the picking coils.

Although a harvester according to my invention may be mounted on a tractor or constructed as a separate self-propelled machine, the following description will be directed to a tractor-mounted machine. The machine may also be constructed for single or multiple roll harvesting. Further, although the machine might be advantageously employed to harvest a variety of produce, the following description will be directed to the harvesting of chili pods from chili plants.

In the drawings, a chili harvester, generally referenced at 10, is mounted on a tractor 11 at a predetermined distance 12 above the ground. The harvester 10 incldues a housing formed by sidewalls 13 and 14, a forward wall 15, a rear wall 16, a top wall 17 and a bottom wall or floor 18.

As the tractor 11 and harvester 10 move forward through a field of chili plants, a row of plants substantially aligned with harvester 10 has the individual plants thereof guided into the harvester by a pair of forwardly extending tapered guide members 19 and 20. Guide members 19 and 20 are carried by forward surface 15 of the harvester housing and are effective to guide the plants into the harvester through an opening 21 in the forward wall 15 of the harvester housing. The floor 18 of the harvester housing includes a pair of spaced-apart floor sections 18a and 18b which define an elongate channel 29 for receiving the stalks of the chili plants as the harvester moves forward through the field. A pair of rubber strips 30 and 31 are secured to their respective floor sections 18a and 18b on each side of elongate channel 29 and are arranged to provide a close fit about the chili stalks to prevent loss of pods through channel 29 to the ground, the rubber strips 30 and 31 being sufficiently soft to prevent damage to the stalks of the chili plants.

As the plants move rearwardly relative the harvester 10, they encounter a plurality of rotating picking coils 32, 33, 34 and 35 secured to respective elongate shafts 36, 37, 38 and 39. The elongate shafts are journalled to the upper wall 17 and the floor sections 18a and 18b by bearings 40, 41, 42 and 43 and by lower self-centering bearings, bearings 44, 45 and 46 of which are illustrated in the drawings. With particular reference to FIG. 3 attention is invited that the elongate shafts are actually journalled to their upper bearings through universal joints and extension shafts, universal joints 47 and 48 being particularly illustrated in FIG. 3 and extension shafts 49, 50, 51 and 52 being particularly illustrated in FIGS. 2 and 3. The universal joints and extension shafts are provided in order to maintain alignment of the powering apparatus while permitting varying angular disposition of the elongate shafts 36–39.

Figure 4:
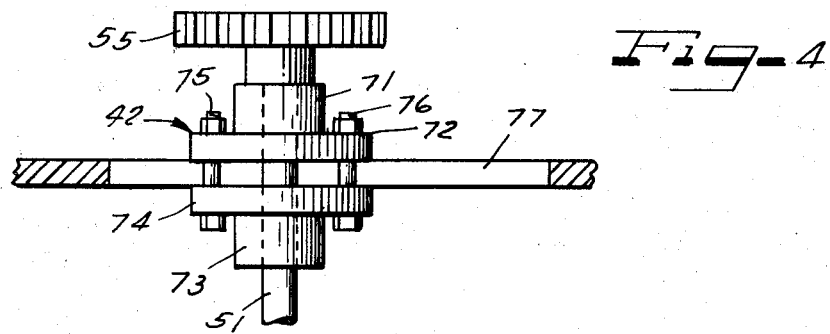
FIG. 4 is an enlarged fragmentary view of one type of bearing which may be employed as the upper bearings for a picking coil, and illustrates the adjustable relationship between an upper bearing and the top wall of the harvester.

Each of the upper bearings, for example bearing 42 of FIG. 4, includes an upper bearing housing 71 having an integral flange 72 and a lower bearing housing 73 having an integral flange 74 which are secured together by fasteners 75 and 76, for example machine screws or bolts, which extend through elongate slots 77 in upper wall 17. The bearings may be releasably secured to upper wall 17 at various positions along slot 77.

Figure 5:
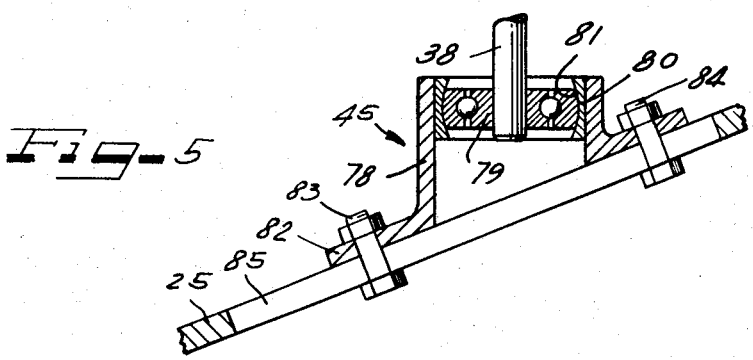
FIG. 5 is an enlarged fragmentary view, in cross-section, of one type of self-centering bearing which may be employed as a lower bearing for a picking coil showing its adjustable relationship to a floor section of the harvester.

In a manner similar to that just-described for the upper bearings, each lower bearing, for example, bearing 45 of the FIG. 5, may be releasably secured to the slanted portion 25 of the floor 18 of the harvester to accommodate lack of requirements as the upper bearings are adjusted. Bearing 45 comprises a bearing housing 78 containing a bearing 79 having a curved surface 80 which matches the curved surface 81 of the bearing insert to provide a self-centering and pivotal mounting of the corresponding shaft in the bearing. The bearing further includes a mounting flange 82 which is releasably secured to wall portion 25 by fasteners 83 and 84 which extend through elongate slot 85. As the upper bearings are adjusted, the lower bearings may also be adjusted to compensate for shaft length in that extensive outward movement of an upper bearing, for example, will require some compensating outward movement of a corresponding lower bearing. The extension shafts 49–52 have respective sprockets 53–56 secured thereto and entrained with a drive chain 60, a drive sprocket 57 and an idler sprocket 58. A prime mover 59 is coupled to the drive sprocket 57 to provide the motive power for rotating the picking coils.

As a plant encounters the picking coils which are rotating in the directions indicated by the curved arrows in FIG. 2, the coils are effective to provide first a lifting action to the pods by rotatably slipping beneath the pod to lift it to a point of resistance and then to snap the pod from the plant. The elevation above ground a which the coils engage the pods to provide the lifting action is preselected by adjustment of the angle of the coils; therefore, pods growing above the selective level are permitted to pass through the harvester unmolested.

The picking coils may be provided as a plurality of pairs of coils which form successive picking stations each of which has a separate picking level in order to more advantageously pick larger portions of the individual plants. For example, assume that pairs of coils 32–33, 34–35, etc., are located at longitudinally spaced-apart stations and that coils 32–33 pick all pods below a first elevation, and coils 34–35 pick all pods below a second higher elevation, and so on, each pair of springs will be used less, forward speed of the harvester may be increased and more complete harvesting may be achieved. The effective elevation of picking will, in such a case, be the elevation of the most vertically oriented pair of coils and pods above that elevation wall pass unmolested.

Upon being snapped from the plants, the pods fall to the floor or bottom wall 18. Each floor section 18a and 18b is provided by a plurality of respective horizontal portions 23 and 24, slanted portions 25 and 26, and vertical portions 27 and 28. The slanted portions 25 and 26 direct the pods away from the center of the harvester to conveyors 61 and 62 which are disposed adjacent the sidewalls 13 and 14 and the bottom wall portions 23 and 24 whereupon the chili pods are transported to the rear of the harvester to corresponding conveyors 64 and 65 of the elevator-type having lifting protrusions 66 for carrying the pods to openings 67 and 69 in rear wall 16 for discharge through chutes 68 and 70. Conveyors 61 and 62 include conveyor rollers which are journalled in sidewalls 13 and 14 and vertical wall portions 27 and 28 by any of several well known techniques. Similarly, elevator conveyors 64 and 65 are journalled in sidewalls 13 and 14 and wall portions 27 and 28 at their lower ends and may, by means of a common shaft, such as shaft 88, require only sidewalls 13 and 14 for journalling at their upper ends.

Mechanical linkages 86 and 87 have been indicated for the application of power to the conveyors 61, 62, 64 and 65; however, any desired power application and/or power distribution system may be employed.

Although minor modifications might be suggested by those versed in the art, it should be understood that I wish to embody within the scope of the patent warrented hereon all such modifications as reasonably and properly come within the scope of my contribution to the art.

What I claim as my invention is:

1. A harvester for moving over and non-destructively harvesting a field of row-planted fruit-bearing growing plants, comprising
a structure including an upper wall having a first elongate slot therein, a lower wall, and
means forming a fore and aft extending passageway for receiving and discharging successive growing plants of a row,
picking means mounted on said structure to extend into the path of travel of plants and operable to contact and remove the fruit from said plants traveling through said passageway relative said structure, said picking means including elongate shaft means and coil means secured to said shaft means,
adjusting means connected to said picking means for changing the elevation of contact between the plants and said picking means, fruit above the contact elevation being unmolested, said adjusting means comprising means for rotatably journalling said shaft to said upper and lower walls at selected angular dispositions relative the plants and including
first bearing means connecting one end of said shaft means to said lower wall,
second bearing means releasably securing the other end of said shaft means to said upper walls including releasable fastening means extending through said elongate slot for releasably securing said second bearing means at any desired location along said elongate slot, and means for discharging picked fruit from the harvester.

2. The harvester according to claim 1, wherein said shaft means includes an elongate shaft journalled to said lower wall, an extension shaft journalled to said upper wall, and a flexible coupling connecting said elongate shaft and said extension shaft, and said coil means comprises an elongate open resilient coil disposed about and connected to said elongate shaft for mutual rotation therewith.

3. The harvester according to claim 1, wherein
said lower wall includes means forming a second elongate slot therein, and
wherein said first bearing means includes second releasable fastening means extending through said second elongate slot for releasably securing said first bearing at any desired location along said second elongate slot.

4. The harvester according to claim 1 wherein said structure comprises a forward wall, a rear wall, first means forming an opening in said forward wall defining the entrance of said passageway, second means forming an opening in said rear wall defining the exit of said passageway, and third means forming an opening in said lower wall defining the extent of said passageway.

5. The harvester according to claim 4, comprising flexible means substantially covering said opening in said lower wall to prevent loss of fruit therethrough and to prevent damages to the plants.

6. A harvester for moving over and non-destructively harvesting a field of row-planted fruit-bearing growing plants, comprising
a structure including
an upper wall,
a lower wall, and
means forming a fore and aft extending passageway for receiving and discharging successive growing plants of a row,
picking means mounted on said structure to extend into the path of travel of plants and operable to contact and remove fruit from plants traveling through said passageway relative said structure, said picking means comprising
a plurality of elongate shafts,
a plurality of corresponding elongate flexible coils each of which is coaxial with and connected to its corresponding elongate shaft,
a corresponding plurality of other shafts,
a corresponding plurality of flexible couplings each connecting an elongate shaft and a corresponding other shaft, and
means for coupling said plurality of other shafts to receive energy for rotation,
adjusting means connected to said picking means for changing the elevation of contact between the plants and said picking means, the fruit above the contact elevation remaining unmolested, said adjusting means including
a corresponding plurality of first bearings connected to said other shafts including
first means for releasably securing said first bearings to selected positions of said upper wall, and
a corresponding plurality of second bearings including second means for releasably securing said second bearings to selected positions of said lower wall, and
means for discharging picked fruit from said harvester.

7. The harvester according to claim 6, wherein said flexible coils and their corresponding shafts, flexible couplings and bearings are arranged in longitudinally spaced-apart pairs of assemblies with each assembly being spaced-apart from its corresponding assembly transversely of the harvester and adjacent said passageway, whereby each pair of assemblies may be set to pick fruit below different elevations.

8. The harvester according to claim 6, wherein
said lower wall includes a pair of bottom portions and a corresponding pair of slanted portions slanted toward their respective bottom portions for receiving and directing picked fruit toward said bottom portions, and
said means for discharging picked fruit comprises a pair of first conveyors disposed between respective ones of said bottom and slanted portions for receiving and conveying fruit directed toward said bottom portions.

9. The harvester according to claim 8, wherein said means for discharging picked fruit comprises a pair of second conveyors disposed to receive fruit from said first conveyors, said second conveyors including fruit lifting tabs, and said structure comprises discharge chute means disposed in communication with said second conveyors.

References Cited
UNITED STATES PATENTS

| | | | |
|---|---|---|---|
| 1,776,315 | 9/1930 | Friend | 56—33 |
| 2,447,122 | 8/1948 | Horst, Jr. | 56—330 |
| 2,587,553 | 2/1952 | Ward | 56—19 |
| 2,677,227 | 5/1954 | Caldwell | 56—19X |
| 2,874,528 | 2/1959 | Esch | 56—126 |
| 3,014,331 | 12/1961 | Mason, Jr. | 56—33 |

LOUIS G. MANCENE, Primary Examiner

J. N. ESKOVITZ, Assistant Examiner

U.S. Cl. X.R.

56—126; 130—30